United States Patent Office 2,760,175
Patented Aug. 21, 1956

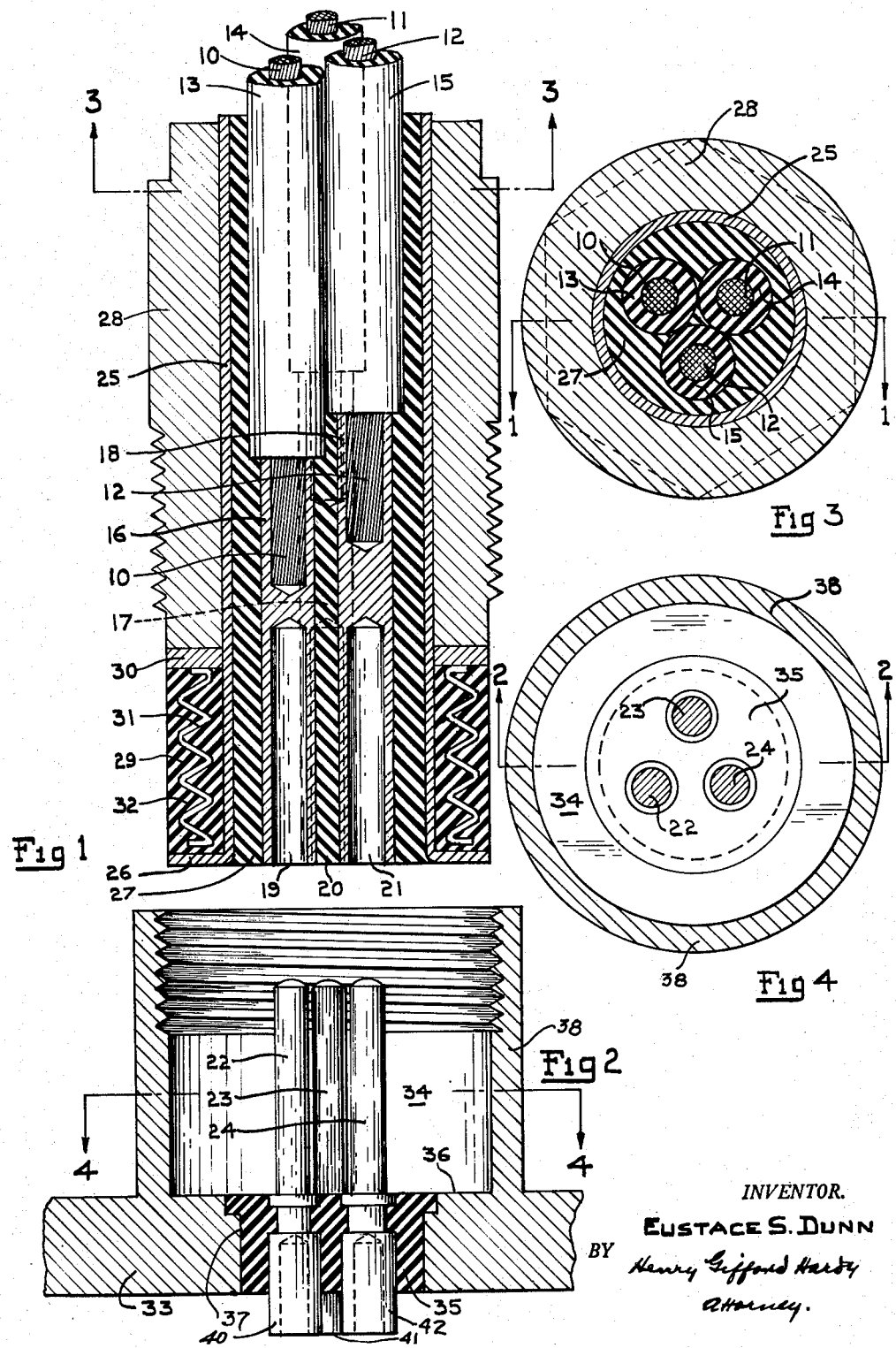

2,760,175

FLUID TIGHT CABLE ENTRY

Eustace S. Dunn, Piedmont, Calif.

Application September 27, 1954, Serial No. 458,351

4 Claims. (Cl. 339—94)

This invention deals with the problem of introducing an electric cable into a sealed housing in such a way that the cable entry is effectively sealed against fluids under pressure and without likelihood of failure after the initial installation.

The aforementioned problem is encountered for example in the installation and operation of motors operated in a fluid. Usually, severe conditions must be met in the installation and operation of motors which form a part of a submersible well pump. Such pumps are, in effect, turbine pumps with a close coupled motor, both turbine and pump being installed near the bottom of the well. Installations are frequently made at a depth of several thousand feet, and the fluid pressure which the cable entry must withstand is correspondingly high.

Difficulties arise in the construction of cable entries in installations of the aforementioned character, due to the fact that insulating materials tend to flow, creep or yield, if subjected to localized forces. For example it has been proposed to construct a cable entry for a multi-wire cable of the type in which each cable conductor has an insulating sheath and all the insulating sheaths are enclosed within a jacket, by leading the cable through a hole in the motor housing large enough to accommodate the cable jacket together with a close fitting soft rubber ring at the point of entry. In such a construction, the rubber ring is longitudinally compressed along the cable, thereby expanding the ring outwardly against the hole in the motor housing wall, and inwardly against the cable jacket. The resulting seal is effective only for a limited time and even then is not dependable. The inward pressure exerted against the cable jacket causes the jacket locally to creep longitudinally away from the ring, thereby reducing the pressure which the ring exerts both inwardly and outwardly. Eventually this pressure becomes insufficient to withstand the fluid pressure, and the cable entry leaks.

Entry of fluid into the motor housing, particularly the space occupied by the stator windings, is quite serious and necessitates extensive repairs since the submersible pump, together with its cable and the long drop pipe leading to the surface, must be pulled from the well before repairs can be made.

In the event that the cable sustains damage as for example when the submersible pump is being lowered into the well, it is desirable that the cable be readily detachable from the motor and either repaired or replaced without the necessity for exposing the ends of the stator windings and remaking a direct joint between them and the cable conductors.

The present invention provides a cable entry of improved construction. More particularly, the construction is such that the insulating covering, be it the conductor sheaths, or the insulating covering, be it the conductor sheaths, or the insulating jacket, or both, are relieved from gasket pressures so that they will not creep, yield or flow. Cable entries embodying the present invention are admirably suited for cables having rubber insulation, as well as cables in which plastics are used as insulators or jacket, or both.

Also the improved construction is equally valuable for cables in which the sheathed conductors are enclosed in a jacket, as well as for cables in which the sheathed conductors are twisted to form a multiwire cable.

The invention is equally adaptable to cables having conductors of the stranded type as well as cables having solid conductors.

The improved construction provides also for the cable being readily detachable from the motor suggesting similarity to the conventional plug and socket.

These and other objects, features and advantages of the invention will appear more fully from the detailed description which follows accompanied by drawings, showing, for the purpose of illustration, a preferred embodiment of the invention. The invention also consists in certain new and original features of construction and combination of elements hereinafter set forth and claimed.

Although the characteristic features of this invention, which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 1 is a longitudinal section of the plug portion of a cable entry embodying the invention, the section being taken on line 1—1 of Figure 3.

Figure 2 is a longitudinal section of the socket portion of the cable entry, the section being taken on line 2—2 of Figure 4.

Figure 3 is a cross-section taken on line 3—3 of Figure 1.

Figure 4 is a cross-section taken on line 4—4 of Figure 2.

In the following description and in the claims, various details will be identified by specific names for convenience. Corresponding reference numerals identify corresponding parts in the several figures of the drawings.

In the drawings accompanying, and forming part of the specification, certain specific disclosure of the invention is made for the purpose of explanation of broader aspects of the invention, but it is understood that the details may be modified in various aspects without departure from the principles of the invention and that the invention may be applied to other structures than the ones shown.

Referring to the drawings, the illustrated cables comprise three conductors 10, 11 and 12 enclosed in sheaths 13, 14 and 15, respectively. The insulating sheaths may be made of any suitable insulating material, such as natural rubber, synthetic rubber, or any of the various nonrigid plastics which in recent years have increasingly taken the place of rubber. Such plastics include the vinyl and polyethylene groups.

The conductors 10, 11 and 12 are shown in the drawings as being of the stranded type, the illustrated cable being selected for flexing. However, the conductors may also be of the solid type in installations where little flexing occurs.

The ends of the cable conductors 10, 11 and 12 are bared so as to expose the same and are then soldered or otherwise mechanically secured within a separate tubular metallic cable socket 16, 17 and 18, the inner end of which is bared to receive the exposed end of the cable conductor. The opposite end of each cable socket provided with noncommunicating borings 19, 20 and 21 adapted to receive socket pins 22, 23 and 24, respectively. It is preferable for the tubular cable sockets 16, 17 and 18 to be of unequal length and for the ends of the cable sheaths 13, 14 and 15 to be of correspondingly unequal lengths so that no two ends of the cable sheaths lie in the same horizontal plane, such as shown in Figure 1.

The three cables and their appended cable sockets are surrounded by a metallic tubular yoke 25 of which the inner end is provided with an outward radial flange 26. In the preferred embodiment, the cables and their appended cable sockets are arranged within the tubular yoke so that they are equidistant from each other (see Figure 3). Other relative placements of the cables and their appended cable sockets may be used, as for example, their longitudinal axes may be arranged in the same plane.

Insulation 27 of any suitable material such as natural rubber, synthetic rubber, or a nonrigid plastic is securely bonded to the inner surface of the metallic tubular yoke 25, to the exteriors of the sheaths and to the cable sockets, to fill the entire volume within the yoke 25. The bond is produced according to the characteristics of the material. In the case of rubber this would be by vulcanizing, the metallic surfaces to be bonded being coated with a suitable adhesive before vulcanizing. In the case of plastic, it is done by molding, the essential requirement being that the bond is secure and fluid tight.

The internal diameter of the tubular yoke 25 and the distances between individual cable sockets 16, 17 and 18 are such as to provide a sufficient thickness of insulating material 27 between them to withstand the voltage between individual cable conductors, and between each conductor and ground.

A metallic jam nut 28 slides on the outer periphery of the tubular yoke 25. In the drawing the jam nut 28 is threaded externally for a portion of its length.

Between the jam nut 28 and the outward radial flange 26 on the tubular yoke 25, a gasket 29 is interposed. The end of the gasket nearest to the jam nut 28 is protected from damage due to rotation of the jam nut by a metallic washer 30.

The gasket 29 comprises a tubular bellows 31, preferably of stainless steel or any suitable nonferrous metal, which is embedded in a resilient compound 32 and securely bonded thereto. The resilient compound is preferably rubber, in which case the bonding is by vulcanizing, the metal bellows 31 being first coated with a suitable adhesive before vulcanizing. The annular gasket 29 is formed under a slight compression so that the natural resiliency of the compound 32 and the compression of bellows 31 will tend to stretch axially and reduce the maximum diameter. The waterproof housing, more specifically the motor housing 33, is provided with a stepped hole 37, protected by a cylindrical boss 38, giving access to the ends of the stator windings, which are not shown, but which are secured within the terminals 40, 41 and 42.

The three socket pins 22, 23 and 24, which are protected by the boss 38 centrally in the space 34, are vulcanized or molded into a hard rubber or rigid plastic socket pin base 35, the socket pin being first coated with a suitable adhesive. The placement of the socket pins relative to each other and to the stepped hole 37 so that its outer surface is in the same plane as the step 36 which engages with the flange 26 on the tubular yoke 25.

The outermost portion of the boss 38 is threaded internally to receive the threads of jam nut 28. When the jam nut is tightened down after the cable sockets have been slid onto the socket pins and the flanged yoke 25 pressed down into the stepped hole, the jam nut moves towards the flange 26 which is restrained from similar movement by the step 36 causing the gasket 29 to be compressed between the flange 26 and the washer 30, and between the outer periphery of the tubular yoke 25 and the inner periphery of the boss 38, respectively.

No forces, particularly no forces in a radial direction, are exerted against either the cap 27 or the sheaths 13, 14 and 15 surrounding the conductors, which would tend to cause the insulation to give way after some time due to continued presence of the force. Thus, the cap, the sheaths, and the yoke serve as an enclosure apart from, and not affected by, compression of the sealing gasket 29.

When the jam nut is removed from the stepped hole, particularly after the lapse of considerable time, the rubber 32 in the gasket 29 has a natural tendency to adhere to the wall of the boss 38 and so to remain in a state of compression, rendering removal of the gasket difficult without mechanical aid which might result in its destruction. This tendency is overcome by the axial pressure exerted by the tubular bellows 31 in returning to its natural length, which retracts the rubber portion of the gasket radially inwards, pulling it free from the wall of the boss 38, so that the yoke and its combination of assembled parts can be easily withdrawn.

The resulting cable entry is inexpensive to produce, simple to install and to remove, and is altogether reliable, thereby eliminating the drawbacks of cable entries heretofore used.

It will be observed that the construction provided for herein is in two cooperating units, one shown in Figure 1 and the other shown in Figure 2.

What I claim is:

1. A fluid and pressure tight cable entry comprising two cooperating units, said first unit comprising a plurality of insulated cables, tubular metallic sockets adapted to separately receive the bared ends of each cable, a metal yoke surrounding said cable ends and sockets having a radial flange at its inner end for direct contact with the floor of the housing of the second unit, an insulating material for holding said cable ends and sockets in spaced relation within said yoke said insulating material being adhesively bonded to said yoke and said cable ends to form a fluid and pressure tight joint between said yoke and said cable ends, a jam nut slidably mounted around said yoke, and a resilient gasket between said radial flange and said jam nut, and said second unit comprising a plurality of socket pins adapted to be received within the sockets of the first unit, said pins being mounted fixedly through a housing, a cylindrical boss on said housing surrounding said socket pins and adapted to receive said first unit in sealed engagement by means of said jam nut and gasket, said gasket being completely contained in the connected position within the metallice enclosure formed by said yoke, said radial flange, said cylindrical boss and said jam nut.

2. A fluid and pressure tight cable entry comprising two cooperating units, the second unit being on the motor housing, said first unit comprising a plurality of insulated cables, tubular metallic sockets adapted to separately receive the bared ends of each cable, a metal yoke surrounding said cable ends and sockets having a radial flange at its inner end for direct contact with the floor of the housing of the second unit, an insulating material bonded to and securely holding said cable ends and sockets in spaced relation within said yoke said insulating material being adhesively bonded to said yoke and said cable ends to form a fluid and pressure tight joint therebetween, a jam nut slidably mounted around said yoke and provided with external threads, and a resilient gasket between said radial flange and said jam nut, and said second unit comprising a plurality of socket pins adapted to be received within the sockets of the first unit, said pins being mounted fixedly through the motor housing, a cylindrical internally threaded boss on said housing surrounding said socket pins and adapted to receive said first unit in threaded sealed engagement by means of said jam nut and gasket, said gasket being completely contained when in coupled position within the metallic enclosure formed by said yoke, said radial flange, said cylindrical boss and said jam nut.

3. A fluid and pressure tight cable entry comprising two cooperating units, the second unit being on the motor housing, said first unit comprising a plurality of insulated cables, tubular metallic sockets adapted to separately receive the bared ends of each cable, a metal yoke surrounding said cable ends and sockets having a radial flange at its inner end, an insulating material bonded to and securely holding said cable ends and sockets in spaced relation within said yoke, a jam nut slidably mounted around said yoke and provided with external threads, and a resilient gasket between said radial flange and said jam nut, said gasket comprising a tubular metallic bellows embedded in a resilient ring, and said second unit comprising a plurality of socket pins adapted to be received within the sockets of the first unit, said pins being mounted fixedly through the motor housing, a cylindrical internally threaded boss on said housing surrounding said socket pins and adapted to receive said first unit in threaded sealed engagement by means of said jam nut and gasket.

4. A fluid and pressure tight cable entry comprising two cooperating units, the second unit being on the motor housing, said first unit comprising a plurality of insulated cables, tubular metallic sockets adapted to separately receive the bared ends of each cable each in a different horizontal plane, a metal yoke surrounding said cable ends and sockets having an outwardly directed radial flange at its inner end for direct contact with the floor of the housing of the second unit, an insulating material bonded to and securely holding said cable ends and sockets in spaced relation within said yoke said insulating material being adhesively bonded to said yoke, sockets and cable ends to form a fluid and pressure tight joint therebetween, a jam nut slidably mounted around said yoke and provided with external threads, and a resilient gasket between said radial flange and said jam nut, said gasket comprising a tubular metallic bellows embedded in a resilient ring, and said second unit comprising a plurality of socket pins adapted to be received within the sockets of the first unit, said pins being mounted fixedly through the motor housing, a cylindrical internally threaded boss on said housing surrounding said socket pins and adapted to receive said first unit in threaded sealed engagement by means of said jam nut and gasket, said gasket being completely contained when in coupled position within the metallic enclosure formed by said yoke and its outwardly directed radial flange, said cylindrical boss and said jam nut.

References Cited in the file of this patent

UNITED STATES PATENTS

| | | |
|---|---|---|
| 2,231,124 | Joseph | Feb. 11, 1941 |
| 2,379,942 | Webber | July 10, 1945 |
| 2,616,942 | Simpson et al. | Nov. 4, 1952 |
| 2,655,638 | Allen | Oct. 13, 1953 |

FOREIGN PATENTS

| | | |
|---|---|---|
| 248,459 | Italy | May 21, 1926 |